(12) United States Patent
Yamazaki et al.

(10) Patent No.: US 9,972,849 B2
(45) Date of Patent: May 15, 2018

(54) COLLECTOR MEMBER, POWER GENERATOR, AND METHOD OF MANUFACTURING COLLECTOR MEMBER FOR POWER GENERATOR

(71) Applicant: KABUSHIKI KAISHA TOSHIBA, Minato-ku (JP)

(72) Inventors: Mutsuki Yamazaki, Yokohama (JP); Yoshihiko Nakano, Yokohama (JP); Wu Mei, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 723 days.

(21) Appl. No.: 14/515,245

(22) Filed: Oct. 15, 2014

(65) Prior Publication Data
US 2015/0083311 A1    Mar. 26, 2015

Related U.S. Application Data

(63) Continuation of application No. 13/417,893, filed on Mar. 12, 2012, now abandoned, which is a (Continued)

(51) Int. Cl.
| | |
|---|---|
| *H01M 4/86* | (2006.01) |
| *H01M 4/88* | (2006.01) |
| *H01M 4/92* | (2006.01) |
| *H01M 8/0234* | (2016.01) |
| *H01M 8/1007* | (2016.01) |

(52) U.S. Cl.
CPC ....... *H01M 4/8875* (2013.01); *H01M 4/8605* (2013.01); *H01M 4/8871* (2013.01); *H01M 4/921* (2013.01); *H01M 4/926* (2013.01); *H01M 8/0234* (2013.01); *H01M 8/1007* (2016.02); *Y02P 70/56* (2015.11)

(58) Field of Classification Search
USPC ............ 156/230, 231, 235, 247, 249, 308.2, 156/309.6
See application file for complete search history.

(56) References Cited

U.S. PATENT DOCUMENTS

| | | |
|---|---|---|
| 6,489,052 B1 | 12/2002 | Acker |
| 7,189,472 B2 | 3/2007 | Suenaga et al. |
| (Continued) | | |

FOREIGN PATENT DOCUMENTS

| | | |
|---|---|---|
| JP | 59-184463 | 10/1984 |
| JP | 05-033016 | 2/1993 |
| (Continued) | | |

OTHER PUBLICATIONS

International Search Report dated Dec. 22, 2009 in PCT/JP2009/066547 filed Sep. 24, 2009.

(Continued)

*Primary Examiner* — Sing P Chan
(74) *Attorney, Agent, or Firm* — Oblon, McClelland, Maier & Neustadt, L.L.P.

(57) ABSTRACT

According to an aspect of the present invention, there is provided a collector member 10 comprising a sheet-shaped base material 11 having a carbon-containing fiber 11a and catalyst particles 12 adhered to an outer periphery of the fiber 11a, containing a noble metal or an alloy thereof, and having an average particle diameter of 0.1 to 2 μm.

7 Claims, 13 Drawing Sheets

Related U.S. Application Data continuation of application No. PCT/JP2009/066547, filed on Sep. 24, 2009.

(56) References Cited

U.S. PATENT DOCUMENTS

| | | | |
|---|---|---|---|
| 7,942,944 | B2 | 5/2011 | Katori |
| 8,007,957 | B2 | 8/2011 | Kim et al. |
| 2004/0023091 | A1 | 2/2004 | Wilkinson et al. |
| 2004/0058227 | A1 | 3/2004 | Tanaka et al. |
| 2005/0053826 | A1 | 3/2005 | Wang et al. |
| 2006/0115712 | A1 | 6/2006 | Kim et al. |
| 2006/0251951 | A1 | 11/2006 | Obata et al. |
| 2007/0218342 | A1 | 9/2007 | Han et al. |
| 2008/0008918 | A1 | 1/2008 | Kim |
| 2010/0021787 | A1 | 1/2010 | Wu et al. |
| 2010/0075201 | A1* | 3/2010 | Nakanishi ........... H01M 4/8657 429/434 |

FOREIGN PATENT DOCUMENTS

| | | |
|---|---|---|
| JP | 7-288136 | 10/1995 |
| JP | 08-321315 | 12/1996 |
| JP | 10-085586 | 4/1998 |
| JP | 2000-251901 | 9/2000 |
| JP | 2002-298861 A | 10/2002 |
| JP | 2004-055519 | 2/2004 |
| JP | 2005-071851 | 3/2005 |
| JP | 2006-147522 | 6/2006 |
| JP | 2007-515364 | 6/2007 |
| JP | 2009-037956 | 2/2009 |
| WO | WO 2007048612 A2 | 5/2007 |
| WO | WO 2007107832 A1 * | 9/2007 .......... H01M 4/8657 |

OTHER PUBLICATIONS

All foreign patent references and non-patent literature are located in parent U.S. Appl. No. 13/417,893.

Office Action dated Feb. 18, 2014 in Japanese Patent Application No. 2011-532828 (with English translation).

Notification of Reason for Rejection dated May 7, 2013 in Japanese Patent Application No. 2011-532828 (with English translation).

The International Preliminary Report on Patentability and Written Opinion dated Apr. 19, 20012, in International application No. PCT/JP2009/066547 (International filed Sep. 24, 2009).

* cited by examiner

COLLECTOR MEMBER, POWER GENERATOR, AND METHOD OF MANUFACTURING COLLECTOR MEMBER FOR POWER GENERATOR

CROSS REFERENCE TO RELATED APPLICATIONS

This application is a continuation of U.S. application Ser. No. 13/417,893 filed Mar. 12, 2012, the entire contents of which is incorporated herein by reference. U.S. application Ser. No. 13/417,893 is a National Stage of PCT/JP09/066547 filed Sep. 24, 2009.

FIELD

The present invention relates to a collector member, a power generator using the collector member, and a method of manufacturing a collector member for a power generator.

BACKGROUND

Noble metals such as Pt are used as chemical catalysts instead of being used in accessories. For example, the noble metals are used in an exhaust emission control system of a vehicle and a solid polymer fuel cell, for example. Particularly, a methanol type solid polymer fuel cell using a methanol solution as a fuel can be operated at low temperature, and, at the same time, since the size and weight are small, the methanol type solid polymer fuel cell has been actively studied recently for the purpose of being applied to a power supply of a mobile apparatus and the like.

Thus, it has been considered to add other elements to PtRu for the purpose of improving methanol oxidation activity. In a solution technique such as a dipping method generally used in catalyst synthesis, a metal desired to be supported is precipitated on a surface of carbon fine particles in a solution to be oxidized once. Thereafter, the oxide is reduced and returned to metal. Accordingly, although heat treatment under a reduction atmosphere is required, the heat treatment temperature significantly varies depending on elements. Pt and Ru often used generally can be reduced at approximately the same temperature, and an alloy of them is easily formed.

However, when an element improving a catalyst activation level is to be contained, some elements can be reduced by raising a temperature to be much higher than a temperature at which the element is reduced to support Pt. Further, at that time, there are many elements that react with carbon as a supporting base material.

Thus, a catalyst synthesis method under vacuum using a sputtering method or an evaporation method is considered. In this method, since a desired element can be directly evaporated to carbon of a supporting base material, reduction treatment is not required to be performed, and PtRu can be easily alloyed at room temperature.

However, in the conventional sputtering method or evaporation method, catalyst fine particles can be supported only on carbon processed into a sheet (hereinafter referred to as "carbon paper"), and the thickness of a catalyst layer is approximately several μm. In a methanol type fuel cell, although a fuel dispersed into anode is oxidized by a catalyst layer, if the catalyst layer is thin, the amount of methanol that is passed through the catalyst layer without being oxidized is increased. Methanol passed through the catalyst layer without being oxidized permeates a proton-conducting membrane separating an anode and a cathode to reach the cathode, and, thus, to generate water by the catalyst of the cathode. When a large amount of water is generated in the cathode, the cathode is clogged with water, and the cathode cannot play an essential role, that is cannot decompose oxygen in the air and generate an oxygen radical, whereby the output is lowered.

Since the catalyst obtained by being sputtered directly on the carbon paper is adhered as a film to a surface of a fiber constituting the carbon paper as shown in FIG. 21, an active surface area is small, and there is a problem that a high output cannot be obtained.

Although water is essential at an anode, if the catalyst layer is thin, the amount of water required for power generation cannot be held in the catalyst layer, so that a satisfactory performance may not be obtained. Thus, although it is considered to increase the thickness of the catalyst layer, if the thickness of the catalyst layer is to be increased, the catalyst layer becomes not fine particles but a film-like shape. Therefore, the surface area of the catalyst is small, and there is a problem that the power generation performance is reduced.

Thus, there has been attempted a method of growing a carbon fiber on the carbon paper by a CVD method and forming a catalyst thereon by the sputtering method. However, when a long carbon fiber is grown, the catalyst is adhered only to the vicinity of the front end of the fiber as shown in FIG. 22. Consequently, since the effective catalyst adhesion area is reduced, a sufficient amount of catalyst cannot be supported, and a high power generation performance cannot be obtained. Further, in the carbon fiber grown by the CVD method, since the mechanical strength and the adhesion strength with a base material are weak, there is such a problem that the catalyst is easily dropped in the process after the catalyst is physically evaporated.

There is disclosed a technique of growing a carbon nanotube with a length of about 10 nm to about 10 mm on a carbon nanofiber substrate and depositing catalyst metal particles such as Pt thereon (for example, see Patent Document 1).

There is further disclosed a technique of sequentially forming a first catalyst layer, an electrolyte layer containing carbon particles and the like, second catalyst layer, and the like on a proton-conducting membrane (for example, see Patent Document 2).

PRIOR ART DOCUMENTS

Patent Document

Patent Document 1: Japanese Patent Application National Publication (Laid-Open) No. 2007-515364
Patent Document 2: Japanese Patent Application Laid-Open (JP-A) No. 2006-147522

DISCLOSURE OF THE INVENTION

Solution to Problem

The present invention has been made in order to solve the above problems, and therefore has an object to provide a collector member having highly active catalyst particles or a catalyst layer and a high-performance power generator. A further object of the present invention is to provide a method of manufacturing a collector member for a power generator that can manufacture the collector member.

Means for Solving the Problems

According to an aspect of the present invention, there is provided a collector member comprising a sheet-shaped base material having a carbon-containing fiber and catalyst particles adhered to an outer periphery of the fiber, containing a noble metal or an alloy thereof, and having an average particle diameter of 0.1 to 2 μm.

According to another aspect of the present invention, there is provided a collector member comprising a first catalyst layer containing a noble metal or an alloy thereof, a second catalyst layer formed on the first catalyst layer and containing a noble metal or an alloy thereof, and a first intermediate layer interposed between the first catalyst layer and the second catalyst layer and containing a carbon fiber.

According to another aspect of the present invention, a power generator comprising the above collector member is provided.

According to another aspect of the present invention, there is provided a method of manufacturing a collector member for a power generator comprising growing a carbon fiber with a length shorter than a diameter of a carbon-containing fiber on an outer periphery of a sheet-shaped base material having the fiber and forming catalyst particles containing a noble metal or an alloy thereof on the outer periphery of the sheet-shaped base material by a physical vapor deposition method, using the carbon fibers as nuclei.

Effect of the Invention

According to the collector member according to an aspect of the present invention, the collector member according to another aspect, and the method of manufacturing a collector member for a power generator according to another aspect, a collector member having a highly active catalyst particles or catalyst layer can be provided. Further, according to the power generator according to another aspect of the present invention, a high-performance power generator can be provided.

DETAILED DESCRIPTION (First Embodiment)

Figure 1:
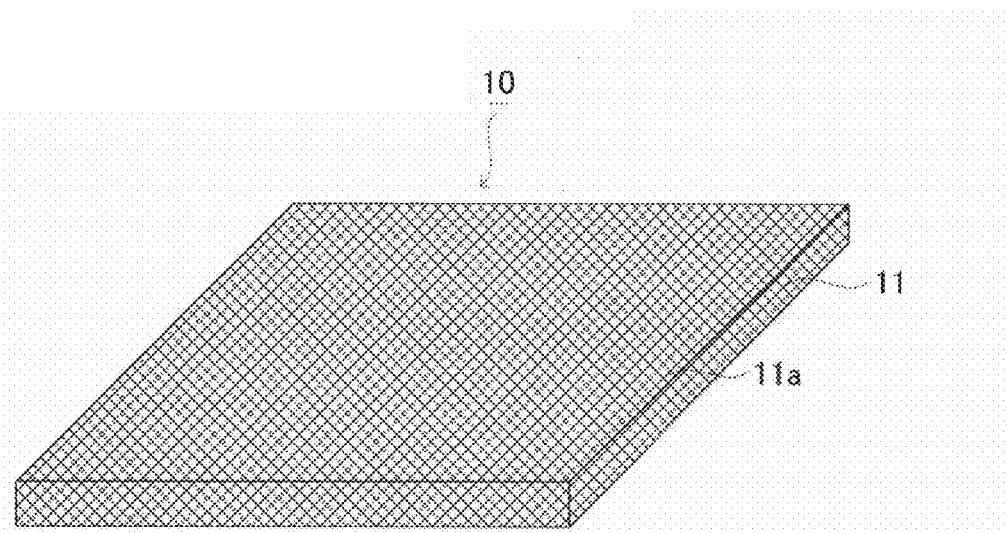
FIG. 1 is a view showing a schematic configuration of a collector member according to a first embodiment.
Figure 2:
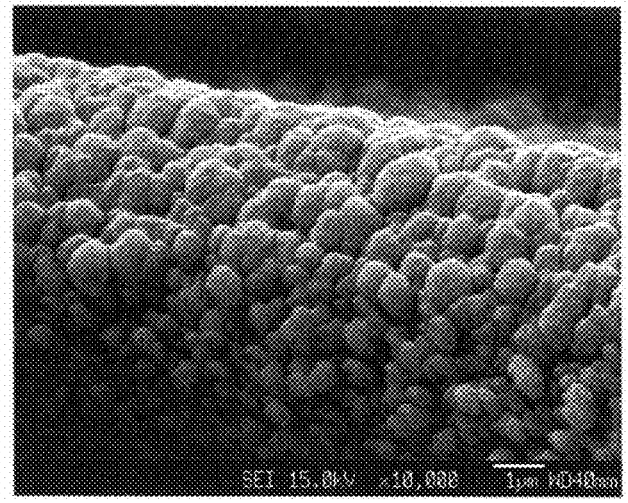
FIG. 2 is a SEM photograph of the collector member according to the first embodiment.
Figure 3:
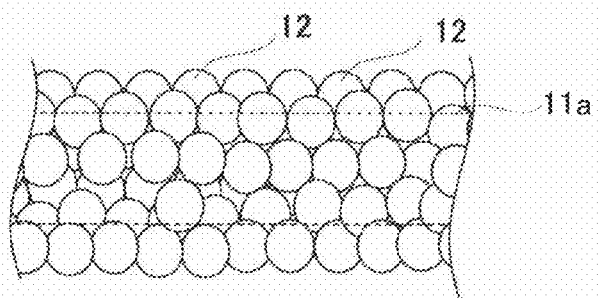
FIG. 3 is a partially enlarged view of the collector member according to the first embodiment.

Hereinafter, a first embodiment of the present invention will be described with reference to the drawings. FIG. 1 is a view showing a schematic configuration of a collector member according to the present embodiment. FIG. 2 is a SEM photograph of the collector member according to the present embodiment. FIG. 3 is a partially enlarged view of the collector member according to the present embodiment.

As shown in FIGS. 1 to 3, a collector member 10 comprises a sheet-shaped base material 11 having a carbon-containing fiber 11a and catalyst particles 12 adhered to an outer periphery of the fiber 11a.

The sheet-shaped base material 11 is not limited especially as long as it has a carbon-containing fiber. Examples of the sheet-shaped base material 11 include a carbon paper. When the radius of the fiber 11a is r, it is preferable that an interval d between the fibers 11a in the sheet-shaped base material 11 satisfies the condition of $r/10 < d < r/3$. This is because if the interval d is $r/10$ or more, the porosity is too high, and the crossover (the passing amount) of methanol becomes large to cause deterioration of performances. Meanwhile, if the interval d is $r/3$ or less, clogging easily occurs even if a slight amount of carbon nanofibers is grown.

The r and d can be determined by measuring the thickness of the fiber and an average value of intervals observed between the fibers at a plurality of points of a photograph observed by a scanning electron microscope (SEM) and calculating the average values of them.

It is preferable that the catalyst particles 12 are adhered to each other with no space therebetween so as to surround the outer peripheries of the fibers 11a as shown in FIGS. 2 and 3. The catalyst particles 12 may have a multilayer structure including 25 catalyst layers, for example.

The catalyst particles 12 contain a noble metal or an alloy thereof. Specifically, the catalyst particles 12 contain a noble metal selected from the group consisting of gold (Au), silver (Ag), ruthenium (Ru), rhodium (Rh), palladium (Pd), osmium (Os), iridium (Ir), and platinum (Pt) or an alloy of them, and the catalyst particles containing a single Pt or an alloy of Pt and Ru is preferably used.

The catalyst particles 12 have an average particle diameter of 0.1 to 2 μm. The average particle diameter is limited to this range because if the average particle diameter is less than 0.1 μm, there is a problem that the catalyst particles are easily burned when taken from a preparation apparatus. In a normal catalyst, although nanosized noble metal fine particles are supported on a surface of a carbon powder, water, carbon dioxide, or the like is absorbed to suppress burning of the noble metal fine particles. If such a catalyst is placed into a vacuum device to remove absorbed water, and, thus, to take out the catalyst in the air, Pt fine particles of the catalyst decomposes oxygen in the air to generate a radical. The oxygen radical reacts with carbon as a carrier to be burned. In the case of a metal not known to be burned usually, when the metal becomes fine particles, the fine particles are easily rapidly oxidized and therefore are burned. When a catalyst is prepared in a vacuum device as in the present invention, the above fireproof treatment cannot be performed, and therefore, if extremely fine particles are prepared, as soon as the fine particles are taken from an apparatus after the preparation to be exposed to the air, the fine particles are burned. If the average particle diameter is more than 2 μm, the particles are agglutinated with each other and become a film-like shape, and the surface area is reduced. "The average particle diameter" can be determined by measuring some points by a scanning electron microscope (SEM) and calculating the average value thereof.

It is preferable that the catalyst particles 12 contain a proton conductor (not shown) such as Nafion (trademark, manufactured by Du Pont) so that proton withdrawn from a fuel such as methanol by the catalyst easily reaches a proton-conducting membrane 26 to be described later.

It is preferable that the gas permeability ($P_1$) of the collector member 10 is 50% or more of the gas permeability ($P_2$) of the single sheet-shaped base material 11. Namely, it is preferable that $P_1 \geq P_2 \times 0.5$. This is because if the gas permeability ($P_1$) of the collector member 10 is less than 50% of the gas permeability ($P_2$) of the single sheet-shaped base material 11, the diffusion speed of the fuel is lowered, and supply is governed, so that the performance may be reduced. The gas permeability can be measured by a mercury intrusion method.

The collector member 10 can be manufactured as follows, for example. First, the catalyst particles 12 are adhered to the outer periphery of the fiber 11a constituting the sheet-shaped base material 11 by a sputtering method. Specifically, sputtering is performed in such a state that an Ar partial pressure is 0.5 Pa or more. Consequently, the catalyst particles 12 having an average particle diameter of 0.1 to 2 μm can be adhered to the outer periphery of the fiber 11a.

Thereafter, the sheet-shaped base material 11 adhered with the catalyst particles 12 is immersed in a solution containing a proton conductor and then dried. Consequently, the collector member 10 can be manufactured.

The catalyst particles 12 can be adhered to the outer periphery of the fiber 11a by other method. FIG. 4 is a view schematically showing a manufacturing process of the collector member 10 according to the present embodiment. FIG. 5 is a SEM photograph of a sheet-shaped base material formed with a carbon fiber according to the present embodiment.

Figure 4A:
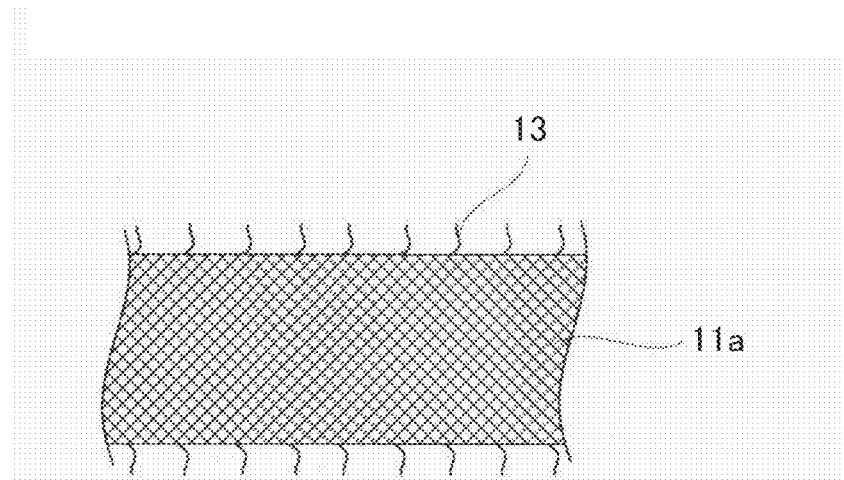
FIGS. 4A and 4B are views schematically showing a manufacturing process of the collector member according to the first embodiment.
Figure 5:
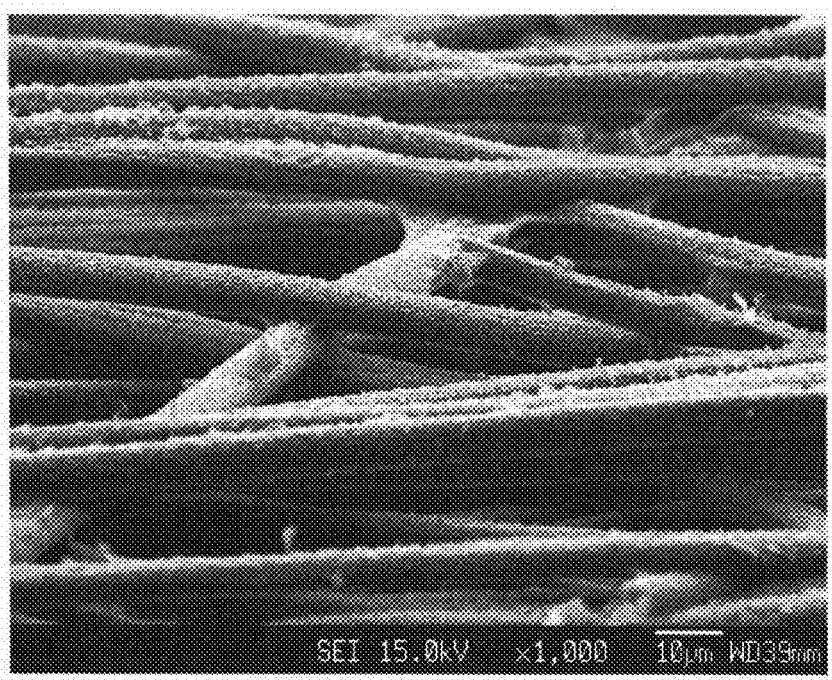
FIG. 5 is a SEM photograph of a sheet-shaped base material formed with a carbon fiber according to the first embodiment.

For example, first, as shown in FIGS. 4A and 5, carbon fibers 13 with a length shorter than a diameter of the fiber 11a are grown on the outer periphery of the fiber 11a constituting the sheet-shaped base material 11 by a low-pressure CVD method, for example. The length of the carbon fiber 13 can be measured by observing a sample grown on a surface of the fiber 11a with the SEM Examples of the carbon fiber 13 include a carbon nanofiber and a carbon nanotube. Although the length of the carbon fiber 13 is not limited especially as long as it is shorter than the diameter of the fiber 11a, the length is preferably approximately ⅒ to ½ of the diameter of the fiber 11a, for example.

When the carbon fibers 13 are grown, Ni and the like are previously adhered to the outer periphery of the fiber 11a using the sputtering method and the like, and it is preferable to grow the carbon fiber 13 using the Ni and the like as the catalyst.

Figure 4B:
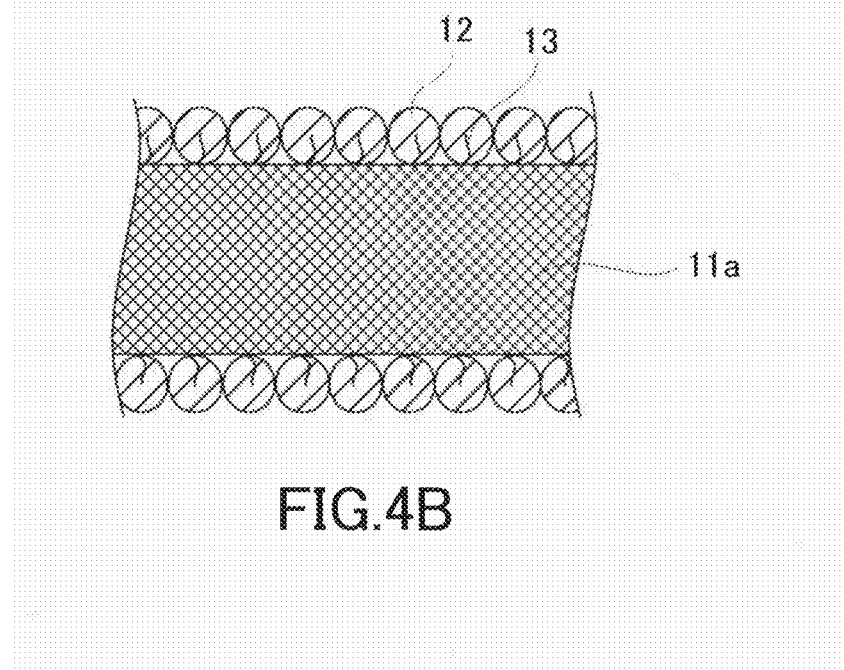

After the carbon fibers 13 are grown on the fiber 11a, as shown in FIG. 4B, the catalyst particles 12 are formed on the outer periphery of the fiber 11a by a physical vapor deposition method such as the sputtering method and a vacuum vapor deposition method, using the carbon fibers 13 as nuclei. Consequently, the catalyst particles 12 having an average particle diameter of 0.1 to 2 μm can be adhered to the outer periphery of the fiber 11a.

Thereafter, the sheet-shaped base material 11 adhered with the catalyst particles 12 is immersed in a solution containing a proton conductor and then dried. Consequently, the collector member 10 can be manufactured.

Figure 6:
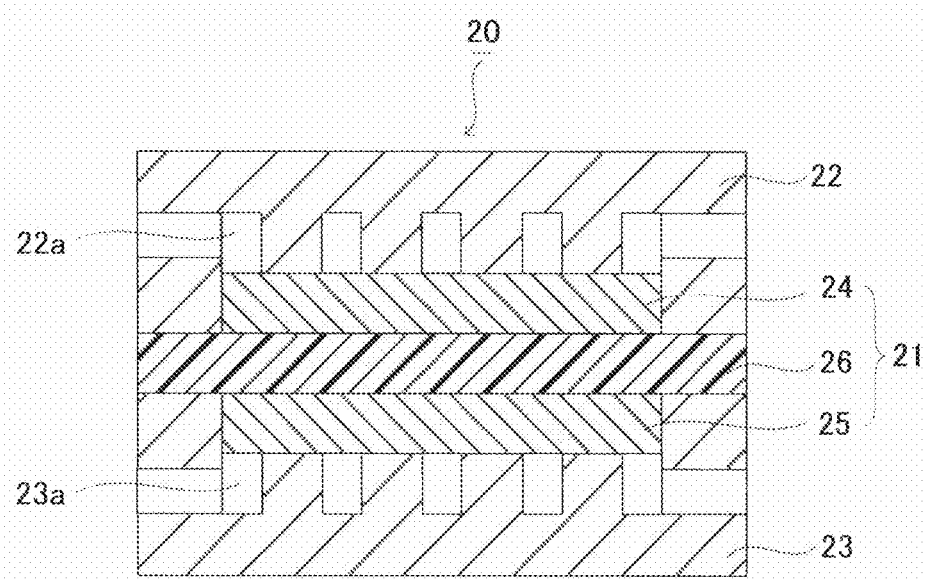
FIG. 6 is a schematic configuration diagram of a power generator according to the first embodiment.

The collector member 10 can be incorporated into a power generator in use. Hereinafter, the power generator including the collector member 10 will be described. FIG. 6 is a schematic configuration diagram of the power generator according to the present embodiment.

As shown in FIG. 6, a power generator 20 functions as a fuel cell, and the power generator 20 comprises a membrane electrode assembly (MEA) 21 and separators 22 and 23 holding the membrane electrode assembly 21 therebetween. In the present embodiment, although a single cell of a fuel cell will be described as the power generator 20, the power generator 20 is not limited thereto and may have a stack structure including a plurality of stacked single cells.

The separators 22 and 23 have flow paths 22a and 23a provided on plates formed of carbon, for example. A fuel such as methanol and hydrogen is supplied into the flow path 22a, and air is supplied into the flow path 23a.

The membrane electrode assembly 21 is mainly constituted of an anode 24, a cathode 25, and a proton-conducting membrane 26 such as Nafion held by the anode 24 and the cathode 25. The anode 24 and the cathode 25 are constituted using the collector member 10.

According to the present embodiment, the catalyst particles 12 having an average particle diameter of 0.1 to 2 μm are adhered to the outer periphery of the fiber 11a constituting the sheet-shaped base material 11, and therefore, when converted into par unit weight, the active surface area as a catalyst is large in comparison with a film-shaped catalyst. According to this constitution, the catalyst particles 12 with high activity can be provided, and the power generator 20 with a high performance can be provided. The adherence strength of the catalyst particles 12 to the sheet-shaped base material 11 is strong, the catalyst particles 12 are not easily dropped from the sheet-shaped base material 11.

Figure 7:
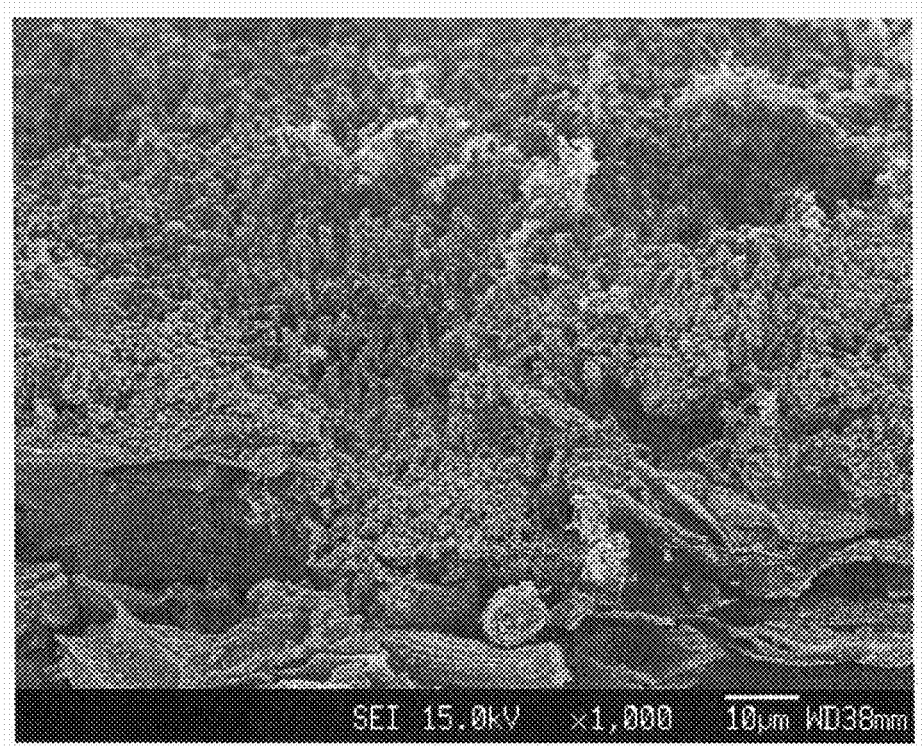
FIG. 7 is a SEM photograph of a collector member according to a reference example when a long carbon fiber is formed.

When the catalyst particles 12 are adhered to the fiber 11a using the carbon fibers 13 with a length shorter than the diameter of the fiber 11a, high power generation characteristics can be obtained in comparison with a case where the catalyst particles are adhered to the fiber using carbon fibers longer than the carbon fibers 13. Namely, since the sheet-shaped base material is formed by stacking the carbon fibers, there are many gaps. However, when long carbon fibers are grown by a normal CVD method, the gaps are filled with the carbon fibers, and therefore, the catalyst cannot easily intrude between the fibers. Thus, as shown in FIG. 7 showing a SEM photograph of a collector member according to a reference example when long carbon fibers are formed, a catalyst is formed on substantially only a surface of a sheet-shaped base material. On the other hand, in the present embodiment, the carbon fiber 13 with a length shorter than the diameter of the fiber 11a is used, and therefore, even when the carbon fibers 13 are grown on the outer periphery of the fiber 11a, the gap can be maintained between the fibers 11a as shown in FIG. 5. Accordingly, the catalyst particles 12 can be intruded into the gap between the fibers 11a, and therefore, even when the catalyst with the same amount as the carbon used when a long carbon fiber is used is adhered to the sheet-shaped base material by the sputtering method, a substantial evaporated surface area is larger than the case where the long carbon fiber is used. Thus, high power generation characteristics can be obtained.

(Second Embodiment)

Figure 8:
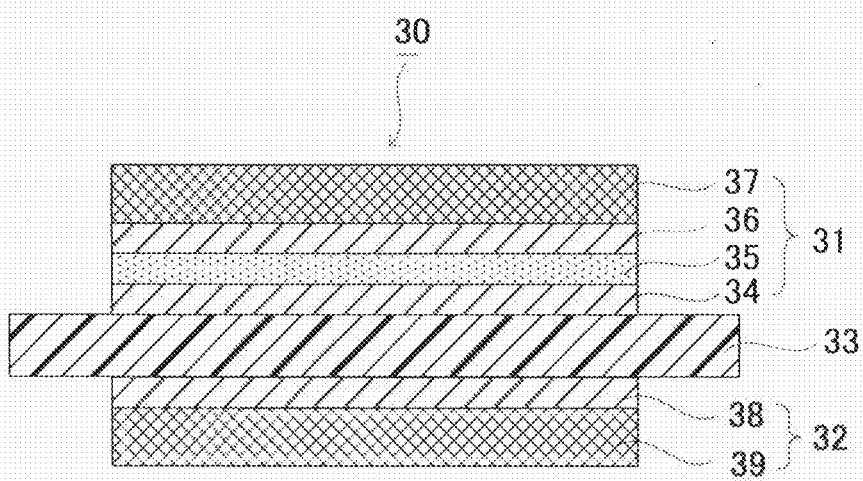
FIG. 8 is a view showing a schematic configuration of a collector member according to a second embodiment.
Figure 9:
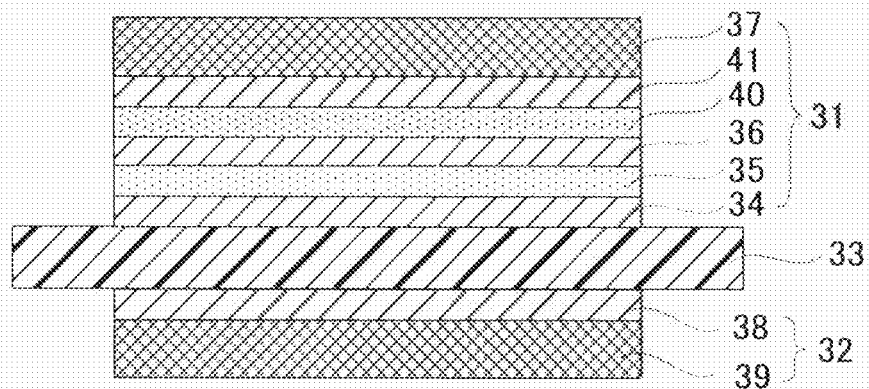
FIG. 9 is a view showing a schematic configuration of another collector member according to the second embodiment.

Hereinafter, a second embodiment of the present invention will be described with reference to the drawings. In the present embodiment, an example of a collector member having a carbon fiber layer between catalyst layers will be described. FIG. 8 is a view showing a schematic configuration of a collector member according to the present embodiment. FIG. 9 is a view showing a schematic configuration of another collector member according to the present embodiment.

As shown in FIG. 8, a collector member 30 is mainly constituted of an anode 31, a cathode 32, and a proton-conducting membrane 33 held by the anode 31 and the cathode 32. The collector member 30 functions as a membrane electrode assembly.

The anode 31 is constituted of a first catalyst layer 34, an intermediate layer 35 as a first intermediate layer, a second catalyst layer 36, and a sheet-shaped base material 37 stacked in this order. Namely, the intermediate layer 35 is interposed between the first catalyst layer 34 and the second catalyst layer 36 and contains the carbon fiber. The first catalyst layer 34 is in contact with the proton-conducting membrane 33. Since the sheet-shaped base material 37 is similar to the sheet-shaped base material 11, the description will be omitted.

It is preferable that the first catalyst layer 34 and the second catalyst layer 36 are constituted of catalyst particles having an average particle diameter of 0.1 to 2 μm. This is because, as in the first embodiment, the active surface area as a catalyst is large in comparison with a film-shaped catalyst. Since the "average particle diameter" of the present embodiment is similar to the "average particle diameter" in the first embodiment, the description will be omitted.

The first catalyst layer 34 and the second catalyst layer 36 contain a noble metal or an alloy thereof. Specifically, the catalyst particles contain a noble metal selected from the group consisting of gold (Au), silver (Ag), ruthenium (Ru), rhodium (Rh), palladium (Pd), osmium (Os), iridium (Ir), and platinum (Pt) or an alloy of them, and the catalyst particles containing an alloy of Pt and Ru is preferably used. The first catalyst layer 34 and the second catalyst layer 36 may contain other elements than a noble metal or an alloy thereof.

When an aqueous methanol solution is used as a fuel, the proper fuel concentration is different depending on a composition of metallic elements constituting a catalyst, and therefore, a composition of the first catalyst layer 34 and at least a portion of constituent elements of the second catalyst layer 36 or a composition ratio of the constituent elements may be different. Namely, for example, a catalyst using an alloy of Pt and Ru is suitable for a case where a fuel has a low methanol concentration and the supply amount is small. Meanwhile, multicomponent alloy catalyst containing, in an amount of approximately 10% to 50% in molar ratio to Pt, at least one or more kinds of elements selected from Hf, Ta, Fe, Mn, W, Mo, V, Al, Ni, and Si in addition to PtPu is suitable for a case where the methanol concentration is high. Accordingly, when PtPu is used in the first catalyst layer 34, and the multicomponent alloy catalyst is used in the second catalyst layer 36, a highly-concentrated aqueous methanol solution is first in contact with the second catalyst layer 36 to generate electric power, and the aqueous methanol solution that is not used in the second catalyst layer 36, permeates the second catalyst layer 36, and is reduced in concentration can be used in the first catalyst layer 34. At this time, the fuel diffusion speed can be suppressed by the intermediate layer 35 as described later. Namely, the fuel that is not used for power generation in the catalyst layer and permeates the catalyst layer can be suppressed. The permeant fuel reacts at cathode to generate water, whereby the performance may be deteriorated. However, a high output can be obtained more stably by suppressing the permeant fuel.

In the present embodiment, the laminate structure comprising the first catalyst layer 34, the intermediate layer 35, and the second catalyst layer 36 is described; however, as shown in FIG. 9, an intermediate layer 40 similar to the intermediate layer 35 is formed on the second catalyst layer 36, and a third catalyst layer 41 may be formed on the intermediate layer 40. In this case, when not only the second catalyst layer 36 but also the third catalyst layer 41 are formed of a multicomponent alloy catalyst, a higher performance can be obtained. When the second catalyst layer 36 and the third catalyst layer 41 are constituted of the multi-component alloy catalyst, the molar ratio to Pt of at least one or more kinds of elements selected from Hf, Ta, Fe, Mn, W, Mo, V, Al, Ni, and Si may be different between the second catalyst layer 36 and the third catalyst layer 41. For example, the first catalyst layer 34 may be constituted of a PtRu layer with a thickness of approximately 10 nm to 100 nm, the second catalyst layer 36 may be constituted of a PtRuHfTa layer (Hf/Pt=0.1, Ta/Pt =0.1) with a thickness of approximately 10 nm to 200 nm, and the third catalyst layer 41 may be constituted of a PtRuHfTa layer (Hf/Pt=0.2, Ta/Pt=0.2) with a thickness of approximately 10 nm to 300 nm. In this case, the fuel diffusion speed is more strictly suppressed by the intermediate layer 35 and the intermediate layer 40, and, at the same time, a concentration gradient of methanol can be easily controlled, so that a higher output can be obtained.

It is preferable that the first catalyst layer 34 and the second catalyst layer 36 contain a proton conductor in order to facilitate reaching of proton, withdrawn from methanol by the catalyst, to the proton-conducting membrane 33. In the first catalyst layer 34 and the second catalyst layer 36, the content (weight ratio) of the proton conductor to a metal functioning as a catalyst may be changed. The "metal functioning as a catalyst" means that it includes all metals functioning as a catalyst but does not include metal oxides. For example, when the content of the proton conductor of the first catalyst layer 34 is smaller than the content of the proton conductor of the second catalyst layer 36, this is suitable for the case where a fuel with a high methanol concentration (mixed fuel of water and methanol) or pure methanol is used. Namely, when the proton content of the second catalyst layer 36 to which the fuel is supplied prior to the first catalyst layer 34 is high, the permeation rate (crossover) in the second catalyst layer 36 can be suppressed, the proton content of the first catalyst layer 34 may be small because the concentration or amount of the permeant fuel is reduced by being used in the power generation in the second catalyst layer 36, and it is possible to obtain such an effect that water is easily returned in a passive type DMFC which returns water reacted at the cathode to the anode and generates electric power. Meanwhile, when the content of the proton conductor of the first catalyst layer 34 is larger than the content of the proton conductor of the second catalyst layer 36, this is suitable for an active type using a mixed fuel with a low methanol concentration containing a sufficient amount of water required for power generation. Namely, while the fuel permeating the second catalyst layer 36 is used in the power generation in the first catalyst layer 34 with a large content of the proton conductor, such an effect that can prevent the fuel from permeating the cathode can be obtained.

Figure 10:
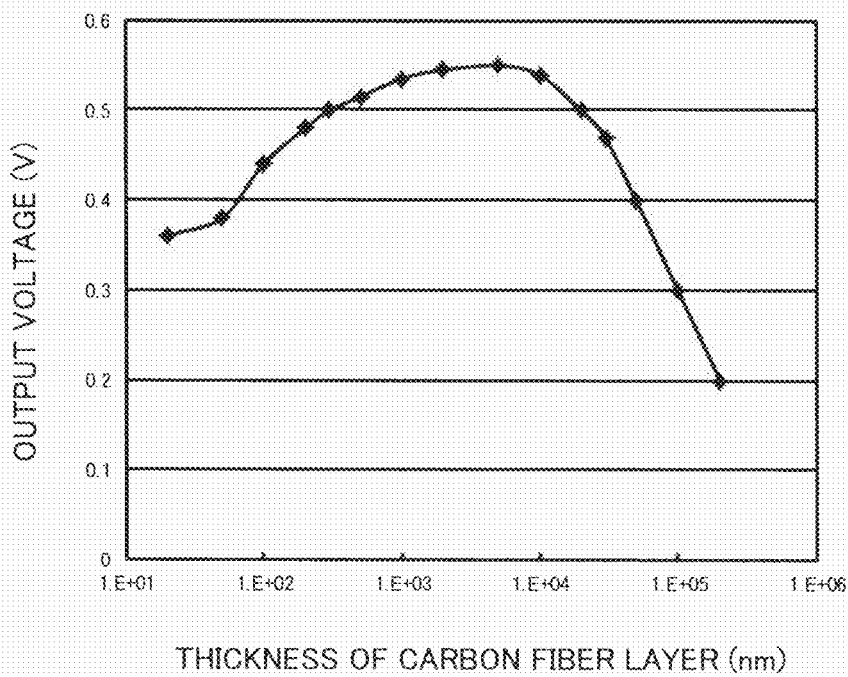
FIG. 10 is a graph showing a relationship between a thickness of a carbon fiber layer and an output voltage.

Examples of the carbon fiber constituting the intermediate layer 35 include a carbon nanofiber and a carbon nanotube. The diameter of the carbon fiber constituting the intermediate layer 35 may be several nm to several ten nm. FIG. 10 is a graph showing a relationship between a thickness of a carbon fiber layer and an output voltage when it is set that a current density of 150 mA/cm$^2$ is maintained. As shown in FIG. 10, when the thickness of the carbon fiber layer is too large, fuel diffusion is inhibited, so that the performance as a fuel cell may be reduced. Thus, the thickness of the intermediate layer 35 is preferably 100 nm or more and 30 μm.

Figure 11:
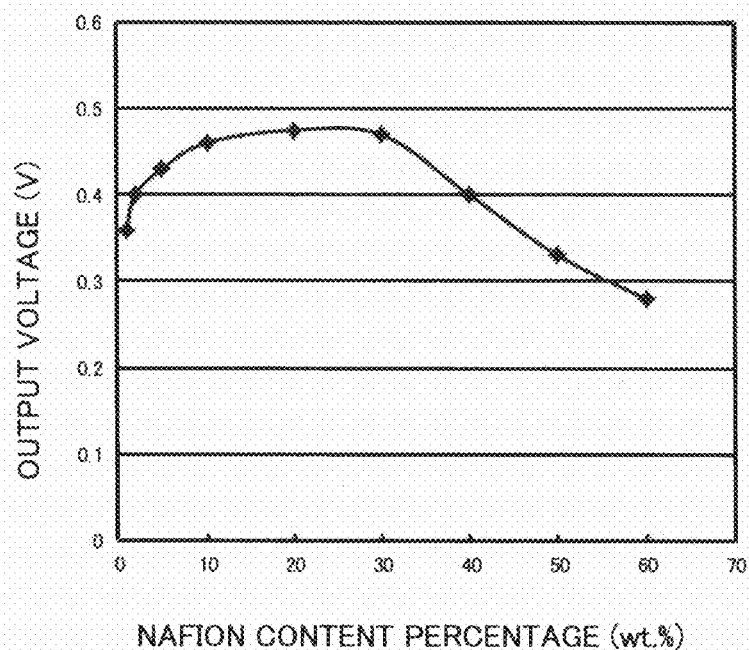
FIG. 11 is a graph showing a relationship between a Nafion content percentage and an output voltage.

The intermediate layer 35 preferably contains the proton conductor in order to impart a proton conductivity. FIG. 11 is a graph showing a relationship between a Nafion content percentage of a carbon fiber layer and an output voltage when the thickness of the carbon fiber layer is 30 μm and it is set that a current density of 150 mA/cm$^2$ is maintained. As shown in FIG. 11, if the content percentage of the proton conductor is too high, the fuel diffusion is inhibited, so that the performance may be reduced. Thus, it is preferable that the content percentage of the proton conductor is 1 wt. % or more and 40 wt. % or less with respect to the total of metal functioning as a catalyst and the proton conductor. When the thickness of the intermediate layer 35 is small, although the content of the proton conductor becomes small, the content percentage becomes high, so that the fuel diffusion can be easily inhibited. However, since the thickness of the intermediate layer 35 is small, it is allowable. Meanwhile, when the thickness of the intermediate layer 35 is large, although the content of the proton conductor is easily increased, the content percentage is not increased, and the content percentage acts effectively if it falls within the above range.

The cathode 32 is constituted of a catalyst layer 38 and a sheet-shaped base material 39. Since the sheet-shaped base material 39 is similar to the sheet-shaped base material 11, the description will be omitted.

It is preferable that the catalyst layer 38 is constituted of the catalyst particles having an average particle diameter of 0.1 to 2 μm. Since the materials of the catalyst layer 38 are similar to the materials of the first catalyst layer 34, the description will be omitted.

The collector member 30 described above can be manufactured as follows, for example. FIGS. 12 and 13 are views schematically showing a manufacturing process of the collector member according to the present embodiment.

Figure 12A:
FIGS. 12A, 12B and 12C are views schematically showing a manufacturing process of the collector member according to the second embodiment.

As shown in FIG. 12A, first, the first catalyst layer 34 is formed on the proton-conducting membrane 33 by a sputtering method in such a state that the Ar partial pressure is 0.5 Pa or more, for example. When the first catalyst layer 34 is formed thus, the first catalyst layer 34 containing the catalyst particles having an average particle diameter of 0.1 to 2 μm can be obtained.

Figure 12B:
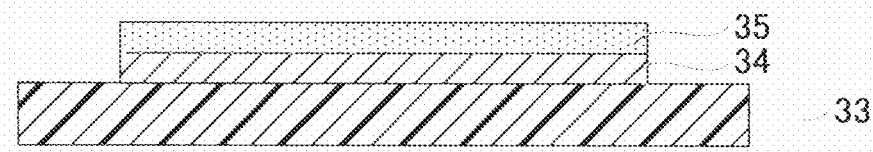

After that, Ni (not shown) is sputtered on the first catalyst layer 34, and the intermediate layer 35 is formed on the first catalyst layer 34 using Ni as the catalyst, as shown in FIG. 12B. When Nafion is used as the proton-conducting membrane 33, Nafion cannot withstand a temperature of 250° C. or more, and therefore, it is preferable that the intermediate layer 35 is formed by a low temperature process such as a low pressure CVD method, a plasma CVD method, and the sputtering method.

Figure 12C:
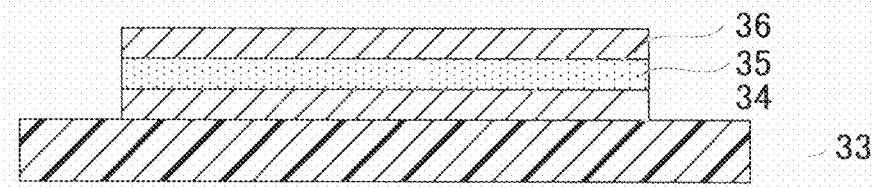

After the formation of the intermediate layer 35 on the first catalyst layer 34, the laminate is immersed in a solution containing a proton conductor, whereby the intermediate layer 35 and the like contain the proton conductor. Then, after the laminate is dried, the second catalyst layer 36 is formed on the intermediate layer 35 by a physical vapor deposition method such as the sputtering method and a vacuum vapor deposition method, as shown in FIG. 12C. When the second catalyst layer 36 is formed thus, the second catalyst layer 36 containing the catalyst particles having an average particle diameter of 0.1 to 2 μm can be obtained.

Figure 13A:
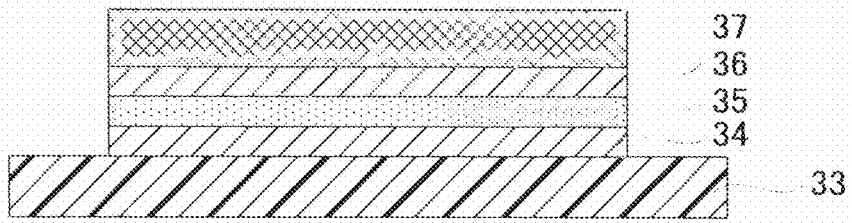
FIGS. 13A, 13B and 13C are views schematically showing a manufacturing process of the collector member according to the second embodiment.

The laminate formed with the second catalyst layer 36 is immersed in the solution containing the proton conductor again, whereby the second catalyst layer 36 and the like contain the proton conductor. Thereafter, the laminate formed with the second catalyst layer 36 is dried. Subsequently, as shown in FIG. 13A, the sheet-shaped base material 37 is arranged on a surface of the second catalyst layer 36, and they are heated and pressure-bonded. Consequently, the anode 31 is formed on the proton-conducting membrane 33.

Figure 13B:
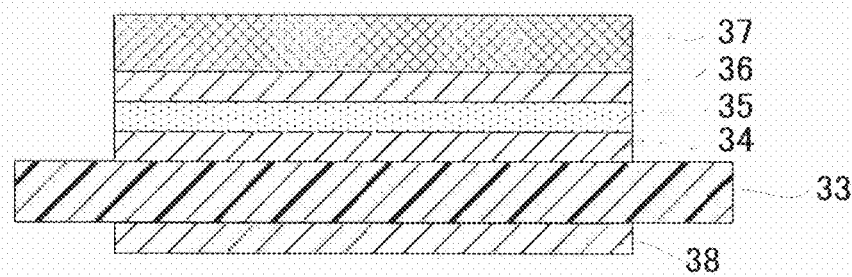

After that, as shown in FIG. 13B, a catalyst layer 38 is formed on the surface opposite to the surface formed with the anode 31 in the proton-conducting membrane 33 by the sputtering method in such a state that the Ar partial pressure is 0.5 Pa or more, for example. When the catalyst layer 38 is formed thus, the catalyst layer 38 on the cathode side containing the catalyst particles having an average particle diameter of 0.1 to 2 μm can be obtained.

Figure 13C:
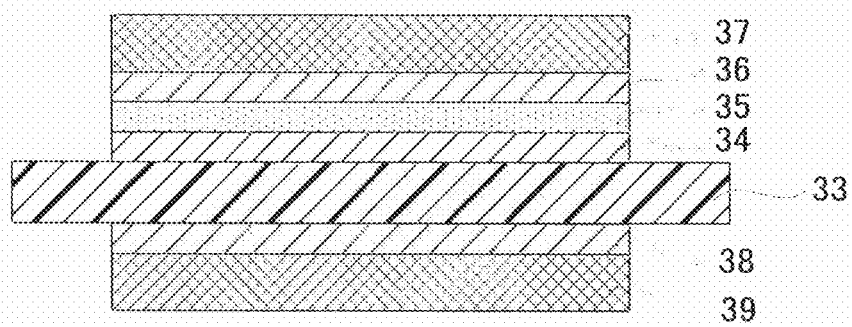

Subsequently, as shown in FIG. 13C, the sheet-shaped base material 39 is arranged on a surface of the catalyst layer 38, and they are heated and pressure-bonded. Consequently, the cathode 32 is formed, and the collector member 30 is manufactured.

The collector member 30 can be manufactured as follows by utilizing a transfer technique. FIGS. 14 to 16 are views schematically showing a manufacturing process of the collector member according to the present embodiment. FIG. 17 is a graph showing a relationship between a thickness of a carbon fiber layer and a transfer efficiency.

Figure 14A:
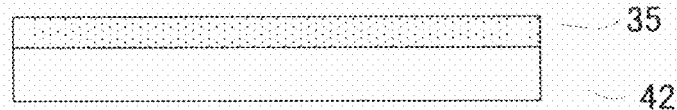
FIGS. 14A, 14B, and 14C are views schematically showing a manufacturing process of another collector member according to the second embodiment.

As shown in FIG. 14A, first, a carbon fiber is grown on a substrate formed of carbon, preferably on a substrate 42 sintered with carbon by a low pressure CVD method or a plasma CVD method for example, and the intermediate layer 35 is formed. Although FIG. 17 is the graph showing the relationship between the thickness of the carbon fiber layer and the transfer efficiency, when the thickness of the intermediate layer 35 is too large as shown in FIG. 17, the transfer efficiency in transfer to be described later may be extremely reduced. Accordingly, when a transfer technique is used, the thickness of the intermediate layer 35 is preferably 100 nm or more and 10 μm or less. The thickness of the intermediate layer 35 can be controlled by a $C_2H_4$ flow rate, a substrate temperature, a pressure, a manufacturing time, and the like. The condition of manufacturing the intermediate layer 35 with a thickness of 1 μm is exemplified as follows:

$C_2H_4$ flow rate: 50 SCCM;
$H_2$ flow rate: 250 SCCM;
pressure: 0.1 atmosphere;
substrate temperature: 400° C.; and
time: 10 minutes.

Figure 14B:
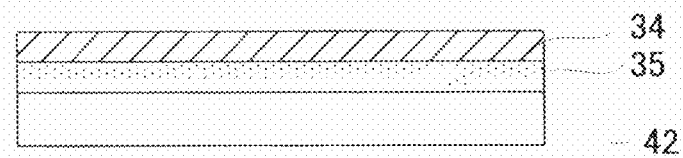
Figure 14C:
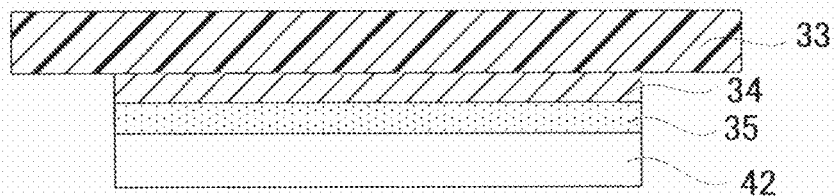

After the formation of the intermediate layer 35 on the substrate 42, the first catalyst layer 34 is formed by the sputtering method in such a state that the Ar partial pressure is 0.5 Pa or more, for example, as shown in FIG. 14B. After that, as shown in FIG. 14C, the proton-conducting membrane 33 is arranged on a surface of the first catalyst layer 34, and they are heated and pressure-bonded.

Figure 15A:
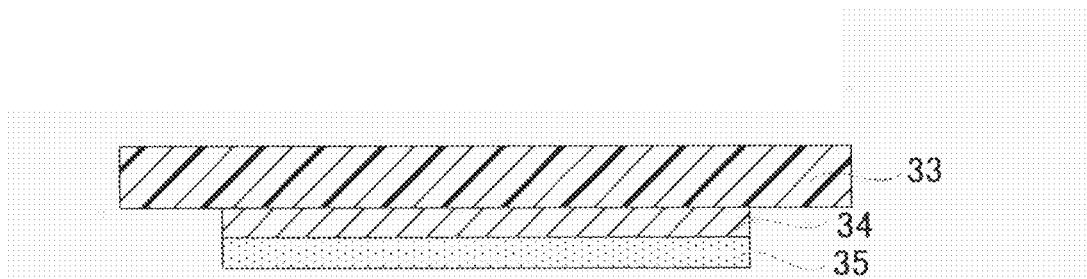
FIGS. 15A, 15B, and 15C are views schematically showing a manufacturing process of another collector member according to the second embodiment.

Subsequently, as shown in FIG. 15A, the substrate 42 is peeled from the laminate. Consequently, the first catalyst layer 34 and the intermediate layer 35 remain on the proton-conducting membrane 33 side, and the first catalyst layer 34 and the intermediate layer 35 are transferred. When the substrate 42 is peeled, the intermediate layer 35 is exposed.

Figure 15B:
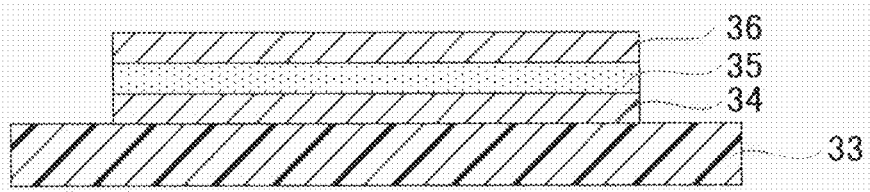

After the substrate 42 is peeled, the laminate is immersed in a solution containing the proton conductor, whereby the intermediate layer 35 and the like contain the proton conductor. Subsequently, after the laminate is dried, the second catalyst layer 36 is formed on the intermediate layer 35 by a physical vapor deposition method such as the sputtering method and a vacuum vapor deposition method as shown in FIG. 15B.

Figure 15C:
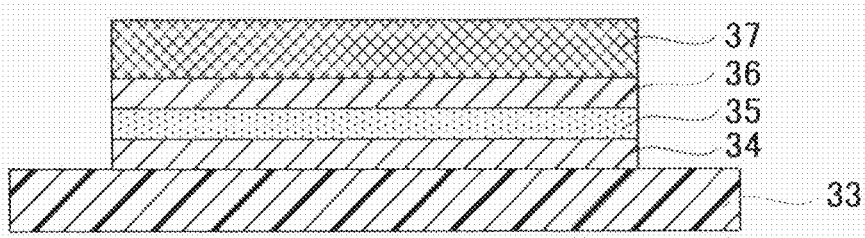

Then, the laminate formed with the second catalyst layer 36 is immersed in a solution containing the proton conductor again, whereby the second catalyst layer 36 and the like contain the proton conductor. Subsequently, as shown in FIG. 15C, the sheet-shaped base material 37 is arranged on the surface of the second catalyst layer 36, and they are heated and pressure-bonded. Consequently, the anode 31 is formed on the proton-conducting membrane 33. In this example, although the second catalyst layer 36 is formed on the intermediate layer 35, the second catalyst layer 36 is previously formed on the sheet-shaped base material 37, and the anode 31 may be formed by pressure-bonding the second catalyst layer 36 to the intermediate layer 35.

Figure 16A:
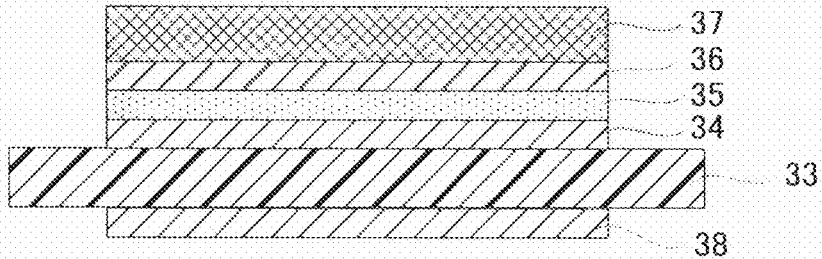
FIGS. 16A and 16B are views schematically showing a manufacturing process of another collector member according to the second embodiment.
Figure 17:
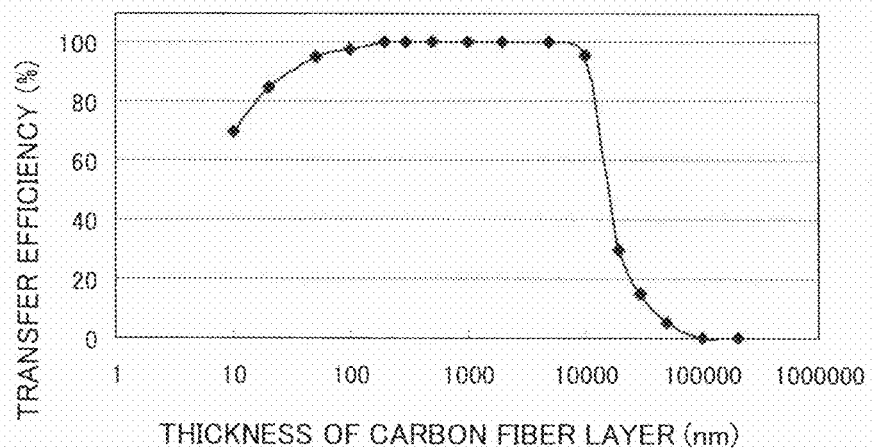
FIG. 17 is a graph showing a relationship between a thickness of a carbon fiber layer and a transfer efficiency.

After that, as shown in FIG. 16A, the catalyst layer 38 is formed on the surface opposite to the surface formed with the anode 31 in the proton-conducting membrane 33 by the sputtering method in such a state that the Ar partial pressure is 0.5 Pa or more, for example.

Figure 16B:
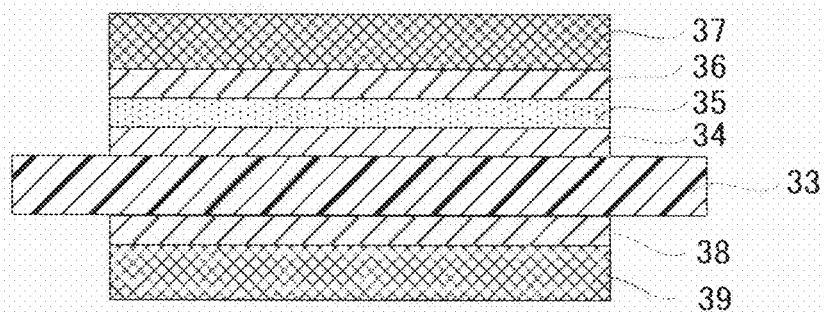

Subsequently, as shown in FIG. 16B, the sheet-shaped base material 39 is arranged on the surface of the catalyst layer 38, and they are heated and pressure-bonded. Consequently, the cathode 32 is formed, and the collector member 30 is manufactured.

Figure 18:
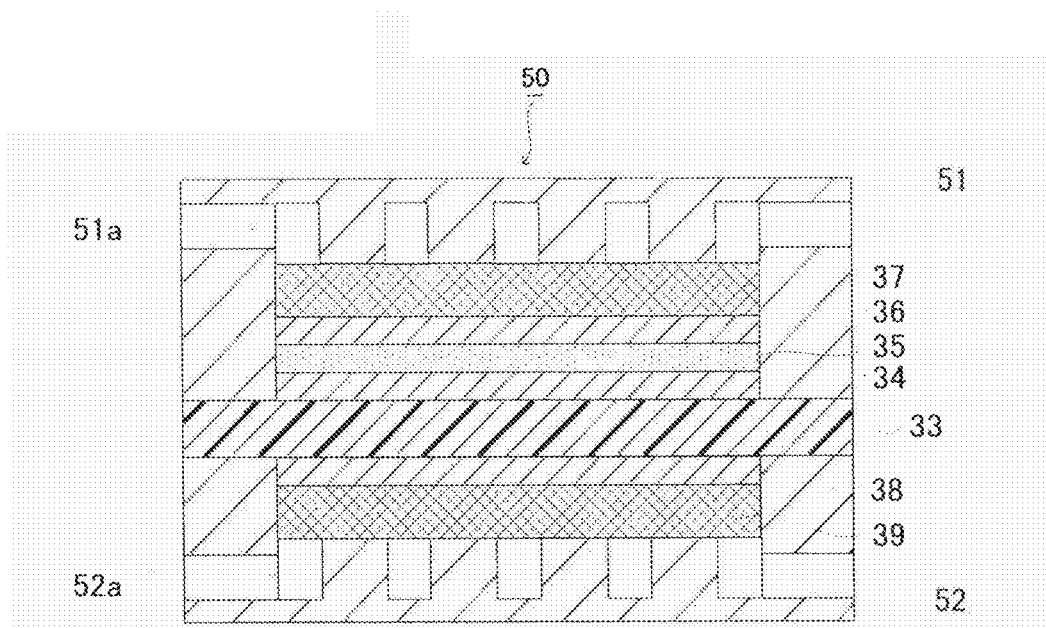
FIG. 18 is a schematic configuration diagram of a power generator according to the second embodiment.

The collector member 30 can be incorporated into a power generator in use. Hereinafter, the power generator including the collector member 30 will be described. FIG. 18 is a schematic configuration diagram of the power generator according to the present embodiment.

As shown in FIG. 18, a power generator 50 functions as a fuel cell and comprises the collector member 30 and separators 51 and 52 holding the collector member 30 therebetween. In the present embodiment, although a single cell of a fuel cell will be described as the power generator 50, the power generator 50 is not limited thereto and may have a stack structure including a plurality of stacked single cells.

The separators 51 and 52 include flow paths 51a and 52a provided on plates formed of carbon, for example. A fuel such as methanol and hydrogen is supplied into the flow path 51a, and air is supplied into the flow path 52a.

According to the present embodiment, since the intermediate layer 35 is interposed between the first catalyst layer 34 and the second catalyst layer 36, the diffusion speed of a fuel such as methanol can be controlled by the intermediate layer 35. Consequently, the fuel permeating the cathode 32 can be significantly reduced. Further, water required for power generation can be held properly.

Furthermore, when the first catalyst layer 34 and the second catalyst layer 36 are constituted of the catalyst particles having an average particle diameter of 0.1 to 2 μm, the active surface area as a catalyst is large in comparison with a film-shaped catalyst. Consequently, highly active catalyst particles can be provided, and the power generator 50 with a high performance can be provided.

When a catalyst layer is formed by the physical vapor deposition method such as the sputtering method, the catalyst particles are localized, and the density is high. Namely, when a cross section of the catalyst layer in a through-layer direction is observed, there is a layer in which the catalyst particles are localized, and in the layer with the localized catalyst particles the density of the catalyst is higher than other portions of the catalyst layer. Consequently, the reaction efficiency is high, and a high performance can be obtained by a small amount of catalyst. However, this premises overcoming such a problem that unreacted methanol easily goes to the cathode. According to the present embodiment, since the fuel permeating the cathode 32 can be significantly reduced by the intermediate layer 35, a high performance can be obtained with a small amount of catalyst. Particularly when an amount of fuel is large, a high output can be obtained.

(Third Embodiment)

Figure 19:
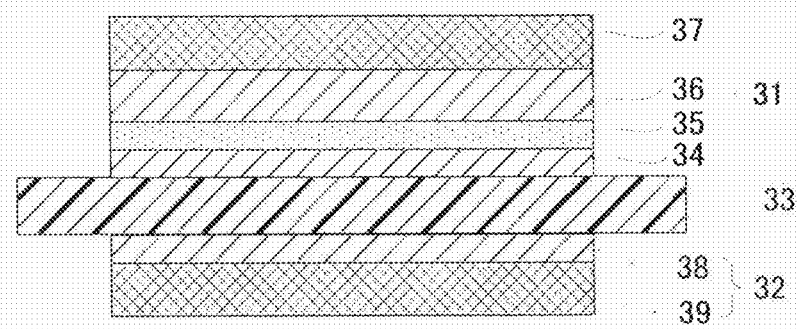
FIG. 19 is a view showing a schematic configuration of a collector member according to a third embodiment.

Hereinafter, a third embodiment of the present invention will be described with reference to the drawings. In the present embodiment, the description of the contents overlapped with those of the second embodiment is omitted, unless otherwise specified. In the present embodiment an example in which the thickness of the first catalyst layer and a second catalyst layer are different from each other will be described. FIG. 19 is a view showing a schematic configuration of a collector member according to the present embodiment.

As shown in FIG. 19, the thickness of a first catalyst layer 34 and the thickness of a second catalyst layer 36 are different from each other. Specifically, in FIG. 19, the thickness of the second catalyst layer 36 is larger than the thickness of the first catalyst layer 34.

According to the present embodiment, since the thickness of the first catalyst layer 34 and the thickness of the second catalyst layer 36 are different from each other, an effect similar to that when the concentration of the proton conductor is different can be obtained. Namely, this is suitable for the case where a fuel with a high methanol concentration (mixed fuel of water and methanol) or pure methanol is used.

When the thickness of the second catalyst layer 36 to which the fuel is supplied prior to the first catalyst layer 34 is large, the permeation rate (crossover) in the second catalyst layer 36 can be suppressed, the thickness of the first catalyst layer 34 may be small because the concentration or amount of the permeant fuel is reduced since the fuel is used in the power generation in the second catalyst layer 36, and it is possible to obtain such an effect that water is easily returned in a passive type DMFC which returns water reacted at the cathode to the anode and generates electric power.

When the thickness of the first catalyst layer 34 is larger than the thickness of the second catalyst layer 36, this is suitable for an active type using a mixed fuel with a low methanol concentration containing a sufficient amount of water required for power generation. Namely, while the fuel transmitted through the second catalyst layer 36 is used in the power generation in the first catalyst layer 34 with a large thickness, such an effect that can prevent the fuel from permeating the cathode can be obtained.

(Fourth Embodiment)

Figure 20:
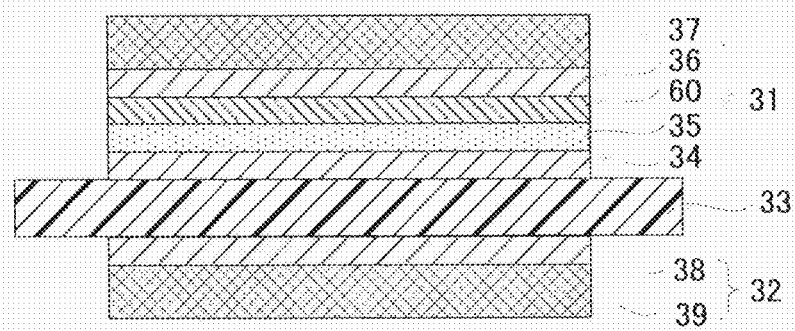
FIG. 20 is a view showing a schematic configuration of a collector member according to a fourth embodiment.
Figure 21:
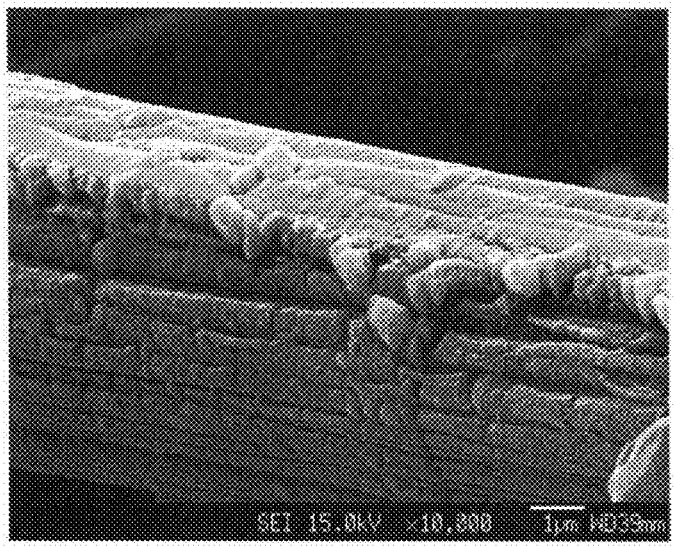
FIG. 21 is a SEM photograph showing a state of a catalyst when the catalyst is formed on a carbon paper by the conventional method.
Figure 22:
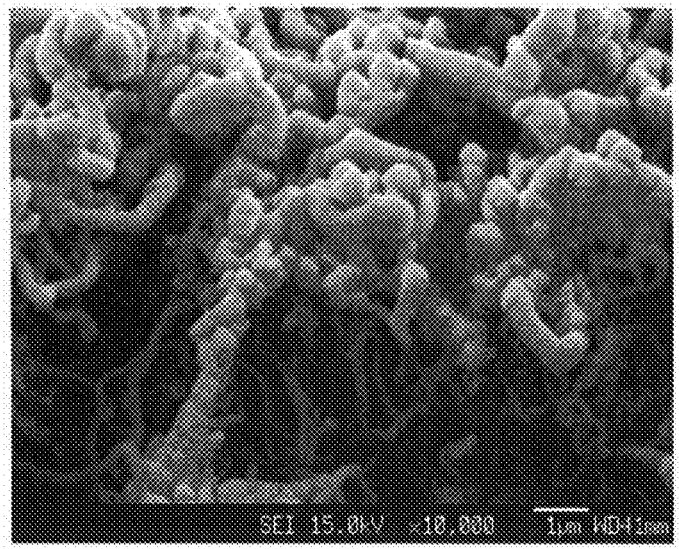
FIG. 22 is a SEM photograph showing a state of a catalyst when the catalyst is formed on the carbon paper on which a long carbon fiber is grown by another conventional method.

Hereinafter, a fourth embodiment of the present invention will be described with reference to the drawings. In the present embodiment, the description of the contents overlapped with those of the second embodiment is omitted, unless otherwise specified. In the present embodiment, an example in which an intermediate layer is formed between a carbon fiber layer and a second catalyst layer will be described. FIG. 20 is a view showing a schematic configuration of a collector member according to the present embodiment.

As shown in FIG. 20, an intermediate layer 60 as a second intermediate layer is formed between an intermediate layer 35 and a second catalyst layer 36. The intermediate layer 60 is constituted of a proton conductor and carbon. Namely, the intermediate layer 60 does not contain element to be a catalyst.

When only methanol is used as a fuel, methanol permeating an anode reaches a cathode, whereby water required for power generation is created, and the water is supplied by returning to the anode. Although water is essential in the power generation, if a catalyst layer is covered by water, methanol cannot be oxidized, and the power generation may not be performed. According to the present embodiment, since not only the intermediate layer 35 but also the intermediate layer 60 are provided, the second catalyst layer 36 can be suppressed from being covered by water.

EXAMPLES

Hereinafter, examples will be described. In the present examples, a single cell of a fuel cell comprising the collector member according to the above embodiment was manufactured, and a cell voltage was measured.

Example 1

First, PtRu was sputtered on a carbon paper having a carbon fiber as a sheet-shaped base material, for example on TGH-090 manufactured by Toray Industries, Inc. under the following conditions so that the thickness was approximately 0.3 mg/cm$^2$ per a unit area of a carbon fiber. PtRu particles formed under the condition have an average particle diameter of 0.1 to 2 µm and were adhered to the outer periphery of the carbon fiber constituting the carbon paper. The condition was as follows:
RF Power: 1 kW;
Ar flow rate: 50 SCCM; and
pressure: 1 Pa,
wherein SCCM is a unit representing a flow rate (ml/min) in terms of a normal state (0° C., 1 atmosphere).

The sample obtained as described above was immersed in a solution prepared by dissolving Nafion in ethanol to have a concentration of 2 wt. % and then dried at a room temperature, and an anode and a cathode as collector members were manufactured.

Then, Nafion 117 (manufactured by Du Pont) as a proton conductive membrane was held between the anode and the cathode and heated and pressure-bonded at 125° C. and a pressure of 30 kg/cm$^2$ for 10 minutes, and a membrane electrode assembly was manufactured.

Example 2

First, a Ni layer with a thickness of approximately 20 nm was formed on a carbon paper having a carbon fiber as a sheet-shaped base material by a sputtering method. Subsequently, the carbon paper formed with the Ni layer was placed for 5 minutes under the following condition, and a minute carbon fiber was grown on an outer periphery of a fiber constituting the carbon paper, by a low pressure CVD method, using Ni as a nucleus. The length of the grown carbon fiber was approximately 1/10 to 1/2 of the diameter of the carbon fiber of the carbon paper. The condition was as follows:
$H_2$ flow rate: 200 SCCM;
$C_2H_4$ flow rate: 20 SCCM;
pressure: 0.1 atmosphere; and
temperature: 550° C.

Subsequently, PtRu was sputtered on the carbon paper with the grown carbon fiber under the following conditions so that the thickness was approximately 0.3 mg/cm$^2$. PtRu particles formed on the carbon fiber had an average particle diameter of 0.1 to 2 µm and were adhered to the outer periphery of the fiber constituting the carbon paper in a state of using the carbon fibers as nuclei. The condition was as follows:
RF Power: 1 kW;
Ar flow rate: 50 SCCM; and
pressure: 0.1 Pa.

The sample obtained as described above was immersed in a solution prepared by dissolving Nafion in ethanol to have a concentration of 2 wt. % and then dried at a room temperature, and an anode and a cathode as collector members were manufactured.

Then, Nafion 117 (manufactured by Du Pont) as a proton conductive membrane was held between the anode and the cathode and heated and pressure-bonded at 125° C. and a pressure of 30 kg/cm$^2$ for 10 minutes, and a membrane electrode assembly was manufactured.

Example 3

First, PtRu was sputtered on the Nafion 117 (manufactured by Du Pont) as a proton conductive membrane under the following condition to form a PtRu layer with a thickness of 200 nm as a first catalyst layer. The PtRu layer formed under the condition was constituted of PtRu particles having an average particle diameter of 0.1 to 2 µm. Further, a Ni layer with a thickness of 50 nm was formed on the PtRu layer by a sputtering method under a similar condition. The condition was as follows:
RF Power: 1 kW;
Ar flow rate: 50 SCCM; and
pressure: $1 \times 10^{-2}$ Pa.

Subsequently, a carbon fiber layer as a first intermediate layer was formed on the PtRu layer by a plasma CVD method under the following condition:

RF Power: 100 W;
C$_2$H$_4$ flow rate: 50 SCCM;
H$_2$ flow rate: 250 SCCM;
pressure: 10 Pa; and
substrate temperature: 200° C.

The sample obtained as described above was immersed in a solution prepared by dissolving Nafion in ethanol to have a concentration of 2 wt. %. The sample was dried at a room temperature, and thereafter, a PtRu layer with a thickness of 200 nm was formed as a second catalyst layer on the carbon fiber layer by the sputtering method. The PtRu layer formed on the carbon fiber layer was constituted of PtRu particles having an average particle diameter of 0.1 to 2 μm.

After that, the sample was immersed in a solution prepared by dissolving Nafion in ethanol to have a concentration of 5 wt. %. Thereafter, a carbon paper as a sheet-shaped base material was stacked on the PtRu layer as a second catalyst layer and heated and pressure-bonded at 125° C. and a pressure of 30 kg/cm$^2$ for 10 minutes, and an anode was manufactured on the Nafion 117.

Subsequently, a Pt layer was formed on the surface opposite to the surface formed with the anode in the Nafion 117 by the sputtering method, and the carbon paper was stacked on the Pt layer and pressure-bonded. Consequently, a cathode was manufactured on the Nafion 117, and a membrane electrode assembly was manufactured.

Example 4

First, a carbon fiber layer with a diameter of several nm to several ten nm was grown as a first intermediate layer on a substrate formed of carbon by a low pressure CVD method. After that, PtRu was sputtered on the carbon fiber layer under a condition similar to the example 3 to form a PtRu layer with a thickness of 200 nm as a first catalyst layer. The PtRu layer formed on the carbon fiber layer was constituted of PtRu particles having an average particle diameter of 0.1 to 2 μm.

Then, the Nafion 117 as a proton-conducting membrane was stacked on the PtRu layer so as to be in contact with the PtRu layer and heated and pressure-bonded at 125° C. and a pressure of 30 kg/cm$^2$ for 10 minutes, and thereafter, only a substrate was peeled from the sample.

Subsequently, the sample in which a carbon fiber layer was exposed by peeling only the substrate was immersed in a Nafion solution of 2 wt. % and then dried at a room temperature. After that, a PtRu layer with a thickness of 200 nm was formed as a second catalyst layer on the carbon fiber layer by a sputtering method. The PtRu layer as the second catalyst layer formed on the carbon fiber layer was constituted of the PtRu particles having an average particle diameter of 0.1 to 2 μm.

After that, the sample was immersed in a solution prepared by dissolving Nafion in ethanol to have a concentration of 5 wt. %. Thereafter, a carbon paper as a sheet-shaped base material was stacked on the PtRu layer as the second catalyst layer and heated and pressure-bonded at 125° C. and a pressure of 30 kg/cm$^2$ for 10 minutes, and an anode was manufactured on the Nafion 117.

Subsequently, a Pt layer was formed on the surface opposite to the surface formed with the anode in the Nafion 117 by the sputtering method, and the carbon paper was stacked on the Pt layer and pressure-bonded. Consequently, a cathode was manufactured on the Nafion 117, and a membrane electrode assembly was manufactured.

Example 5

First, a carbon fiber layer with a diameter of several nm to several ten nm was grown as a first intermediate layer on a substrate formed of carbon by a low pressure CVD method as in the example 4. After that, a PtRu layer with a thickness of 200 nm as a first catalyst layer was formed on the carbon fiber layer by a sputtering method. The PtRu layer formed on the carbon fiber layer was constituted of PtRu particles having an average particle diameter of 0.1 to 2 μm.

Then, the Nafion 117 as a proton-conducting membrane was stacked on the PtRu layer and heated and pressure-bonded at 125° C. and a pressure of 30 kg/cm$^2$ for 10 minutes, and then only a substrate was peeled from a sample. Subsequently, the sample in which a carbon fiber layer was exposed by peeling only the substrate was immersed in a Nafion solution of 2 wt. % as in the example 3 and then dried at a room temperature.

Meanwhile, PtRu was sputtered on a carbon paper as a sheet-shaped base material under a condition similar to the example 3 to form a PtRu layer with a thickness of 200 nm as a second catalyst layer. The PtRu layer as the second catalyst layer formed under such a condition was constituted of PtRu particles having an average particle diameter of 0.1 to 2 μm.

After that, the sample formed with the PtRu layer on the carbon paper was immersed in a Nafion solution of 2 wt. % and then dried at a room temperature.

Then, the sample having the carbon paper was stacked on the sample having the Nafion 117 pressure-bonded in advance so that the PtRu layer as the second catalyst layer was in contact with the carbon fiber layer, and the laminate was heated and pressure-bonded at 125° C. and a pressure of 30 kg/cm$^2$ for 10 minutes, and an anode was manufactured on the Nafion 117.

Subsequently, a Pt layer was formed on the surface opposite to the surface formed with the anode in the Nafion 117 by the sputtering method, and the carbon paper was stacked on the Pt layer and pressure-bonded. Consequently, a cathode was manufactured on the Nafion 117, and a membrane electrode assembly was manufactured.

Example 6

First, a carbon fiber layer with a diameter of several nm to several ten nm was grown as a first intermediate layer on a substrate formed of carbon by a CVD method as in the example 4. After that, a PtRu layer with a thickness of 200 nm was formed as a first catalyst layer on the carbon fiber layer by a sputtering method. The PtRu layer formed on the carbon fiber layer was constituted of the PtRu particles having an average particle diameter of 0.1 to 2 μm.

Then, the Nafion 117 as a proton-conducting membrane was stacked on the PtRu layer and heated and pressure-bonded at 125° C. and a pressure of 30 kg/cm$^2$ for 10 minutes, and thereafter, only a substrate was peeled from the sample.

Subsequently, the sample in which the carbon fiber layer was exposed by peeling only the substrate was immersed in a Nafion solution of 2 wt. % and then dried at a room temperature. After that, a slurry prepared by mixing a Nafion solution of 10 wt. % and a carbon fiber powder was coated on the carbon fiber layer to be dried, and, thus, to form an intermediate layer as a second intermediate layer with a thickness of about 10 μm.

Meanwhile, PtRu was sputtered on a carbon paper as a sheet-shaped base material under a similar condition as the example 3 to form a PtRu layer with a thickness of 200 nm as a second catalyst layer. The PtRu layer as the second catalyst layer formed under such a condition was constituted of the PtRu particles having an average particle diameter of 0.1 to 2 μm.

After that, the sample formed with the PtRu layer on the carbon paper was immersed in a Nafion solution of 2 wt. % and then dried at a room temperature.

Then, the sample having the carbon paper was stacked on the sample having the Nafion 117 pressure-bonded in advance so that the PtRu layer as the second catalyst layer was in contact with the intermediate layer as the second intermediate layer. The laminate was heated and pressure-bonded at 125° C. and a pressure of 30 kg/cm² for 10 minutes, and an anode was manufactured on the Nafion 117.

Subsequently, a Pt layer was formed on the surface opposite to the surface formed with the anode in the Nafion 117 by the sputtering method, and the carbon paper was stacked on the Pt layer and pressure-bonded. Consequently, a cathode was manufactured on the Nafion 117, and a membrane electrode assembly was manufactured.

Next, single cells of a fuel direct supply type polyelectrolyte type fuel cell were manufactured using the membrane electrode assembly manufactured in the examples 1 to 6 and a separator. In each of the single cells, a 1M aqueous methanol solution as a fuel was supplied to an anode at the flow rate of 0.6 ml/min, and, at the same time, air was supplied to a cathode at the flow rate of 200 ml/min. When discharge was performed so as to maintain a current density of 150 mA/cm² in such a state that those cells were maintained at 65° C. and the cell voltage after 30 minutes was measured, the voltage of 0.5 V was obtained in all the cells. This value was higher by 20% or more than the anode and the cathode in which a catalyst containing the same noble metal amount was manufactured by the conventional coating method. From this result, it was confirmed that a high output voltage could be obtained in the fuel cells in the examples 1 to 6.

When the catalyst was manufactured in a vacuum process as in the examples 1 to 6, Ru was not oxidized, and therefore, elution by a formic acid occurring in a power generation process was less likely to occur, and it was confirmed that characteristic degradation due to a long period of use was less likely to occur.

REFERENCE SIGNS LIST 10, 30 Collector member
11 Sheet-shaped base material
11a Fiber
12 Catalyst particle
13 Carbon fiber
20, 50 Power generator
33 Proton-conducting membrane
34 First catalyst layer
35, 60 Intermediate layer
36 Second catalyst layer
41 Third catalyst layer

The invention claimed is:

1. A method of manufacturing a collector member, comprising:
   growing a carbon fiber on a substrate formed of carbon to form an intermediate layer;
   forming a first catalyst layer on the intermediate layer;
   arranging a proton-conducting membrane on the first catalyst layer;
   pressure-bonding the first catalyst layer and the proton-conducting membrane under heating;
   peeling the substrate to transfer the intermediate layer and the first catalyst layer on a proton-conducting membrane side;
   forming a second catalyst layer on the intermediate layer after the transfer of the intermediate layer and the first catalyst layer on the proton-conducting membrane side; and
   arranging a first sheet-shaped base material on the second catalyst layer and pressure-bonding the second catalyst layer and the first sheet-shaped base material under heating.

2. The method of manufacturing a collector member according to claim 1, further comprising forming a third catalyst layer on one surface of the proton-conducting membrane, the one surface being opposite to the surface thereof on which the first catalyst layer is formed.

3. The method of manufacturing a collector member according to claim 2, further comprising arranging a second sheet-shaped base material on the third catalyst layer and pressure-bonding the third catalyst layer and the second sheet-shaped base material under heating.

4. The method of manufacturing a collector member according to claim 2, further comprising incorporating a proton conductor into the second catalyst layer after the formation of the second catalyst layer.

5. The method of manufacturing a collector member according to claim 1, further comprising incorporating a proton conductor into the intermediate layer and the first catalyst layer after the transfer of the intermediate layer and first catalyst layer and before the formation of the second catalyst layer.

6. The method of manufacturing a collector member according to claim 1, wherein the intermediate layer has a thickness of 100 nm or more and 10 μm or less.

7. The method of manufacturing a collector member according to claim 1, wherein the carbon fiber is a carbon nanofiber or a carbon nanotube.

* * * * *